(12) United States Patent
Lehman

(10) Patent No.: US 11,052,835 B2
(45) Date of Patent: Jul. 6, 2021

(54) VEHICLE INTERIOR COMPONENT HAVING A COVER LAYER IN CONTACT WITH A FOAM LAYER

(71) Applicant: Motus Integrated Technologies, Holland, MI (US)

(72) Inventor: Philip Allen Lehman, West Olive, MI (US)

(73) Assignee: Motus Integrated Technologies, Holland, MI (US)

( * ) Notice: Subject to any disclaimer, the term of this patent is extended or adjusted under 35 U.S.C. 154(b) by 9 days.

(21) Appl. No.: 16/166,797

(22) Filed: Oct. 22, 2018

(65) Prior Publication Data

US 2020/0122649 A1   Apr. 23, 2020

(51) Int. Cl.
*B60R 13/02* (2006.01)
*B29C 33/42* (2006.01)
(Continued)

(52) U.S. Cl.
CPC .......... *B60R 13/0237* (2013.01); *B29C 33/10* (2013.01); *B29C 33/424* (2013.01); *B29C 44/588* (2013.01); *B60R 13/0256* (2013.01); *B60R 13/0262* (2013.01); *B29K 2027/06* (2013.01); *B29K 2075/00* (2013.01); *B29K 2105/04* (2013.01); *B29L 2031/3005* (2013.01); *B29L 2031/58* (2013.01); *B32B 3/30* (2013.01); *B32B 5/18* (2013.01); *B32B 27/065* (2013.01); *B32B 27/304* (2013.01); *B32B 27/40* (2013.01);
(Continued)

(58) Field of Classification Search
CPC . B60R 13/02; B60R 13/0237; B60R 13/0243; B60R 13/0256; B60R 13/0262; B29C 33/10; B29C 33/424; B29L 2031/3041; B29L 2031/3014; B29L 2031/3008; B29L 2031/3005; B29L 2031/58; B32B 3/30; B32B 27/304; B32B 27/40; B32B 27/065; B32B 2250/03; B32B 2250/24; B32B 2250/40; B32B 2266/0278; B32B 2605/003
See application file for complete search history.

(56) References Cited

U.S. PATENT DOCUMENTS 6,267,918 B1 *  7/2001  Bauer ..................... B29C 59/16
                                                        264/400
6,644,727 B2 * 11/2003  Audibert ............. B29C 44/1209
                                                        296/210
(Continued)

*Primary Examiner* — Gregory A Blankenship
(74) *Attorney, Agent, or Firm* — Fletcher Yoder, P.C.

(57) ABSTRACT

A vehicle interior component includes a foam layer having a contact surface. The vehicle interior component also includes a cover layer having a contact surface and a show surface. The show surface is configured to face an interior of a vehicle, the contact surface of the cover layer is positioned on an opposite side of the cover layer from the show surface,
(Continued)

and the contact surface of the cover layer is in direct contact with the contact surface of the foam layer. In addition, multiple recesses are formed within at least one of the contact surface of the foam layer and the contact surface of the cover layer, each recess establishes a gap between the contact surface of the foam layer and the contact surface of the cover layer at the recess, and the recesses are configured to accommodate gas emitted by the foam layer and/or the cover layer.

8 Claims, 4 Drawing Sheets

(51) Int. Cl.
| | | |
|---|---|---|
| *B29C 44/58* | (2006.01) | |
| *B29C 33/10* | (2006.01) | |
| B29L 31/30 | (2006.01) | |
| B32B 5/18 | (2006.01) | |
| B32B 3/30 | (2006.01) | |
| B32B 27/06 | (2006.01) | |
| B32B 27/30 | (2006.01) | |
| B32B 27/40 | (2006.01) | |
| B29K 105/04 | (2006.01) | |
| B29K 75/00 | (2006.01) | |
| B29K 27/06 | (2006.01) | |
| B29L 31/58 | (2006.01) | |

(52) U.S. Cl.
CPC ....... *B32B 2250/03* (2013.01); *B32B 2250/24* (2013.01); *B32B 2250/40* (2013.01); *B32B 2266/0278* (2013.01); *B32B 2605/003* (2013.01)

(56) References Cited

U.S. PATENT DOCUMENTS

| | | | | |
|---|---|---|---|---|
| 6,899,363 | B2* | 5/2005 | Dry | B29C 45/1675 |
| | | | | 264/33 |
| 7,387,326 | B2* | 6/2008 | Osada | B60R 21/0428 |
| | | | | 296/1.09 |
| 2005/0186388 | A1* | 8/2005 | Mekas | B32B 27/08 |
| | | | | 428/116 |
| 2005/0194806 | A1* | 9/2005 | Cowelchuk | B60N 2/78 |
| | | | | 296/1.09 |
| 2009/0315308 | A1* | 12/2009 | Beau | B60R 13/02 |
| | | | | 280/751 |
| 2015/0030814 | A1* | 1/2015 | Ohmori | B32B 3/28 |
| | | | | 428/178 |
| 2015/0072105 | A1* | 3/2015 | Miyashita | B32B 27/08 |
| | | | | 428/118 |
| 2015/0314737 | A1* | 11/2015 | Zimmer | B29C 43/203 |
| | | | | 296/1.08 |
| 2017/0182729 | A1* | 6/2017 | Fox | B32B 3/266 |
| 2017/0334371 | A1* | 11/2017 | Miyashita | B32B 27/32 |
| 2019/0275932 | A1* | 9/2019 | Cho | G02B 6/0088 |
| 2020/0122649 | A1* | 4/2020 | Lehman | B29C 44/06 |
| 2020/0207287 | A1* | 7/2020 | Takase | B32B 3/12 |

* cited by examiner

VEHICLE INTERIOR COMPONENT HAVING A COVER LAYER IN CONTACT WITH A FOAM LAYER

BACKGROUND

The present disclosure relates generally to a vehicle interior component having a cover layer in contact with a foam layer.

Certain vehicle interior components include a foam layer and a cover layer disposed over the foam layer. The cover layer may form a show surface of the vehicle interior component, and the foam layer may be disposed between the cover layer and a substantially rigid substrate. In certain vehicle interior components, the foam layer may be formed from polyurethane foam, and the cover layer may be formed from polyvinyl chloride. Unfortunately, placing a polyvinyl chloride cover layer in direct contact with a polyurethane foam may cause the cover layer to become warped/distorted over time due to off gassing of the cover layer and/or the foam layer. Accordingly, a barrier layer may be disposed between the cover layer and the foam layer to substantially reduce warping/distortion of the cover layer. However, disposing the barrier layer between the cover layer and the foam layer may substantially increase the manufacturing complexity and the cost of the vehicle interior component.

BRIEF DESCRIPTION OF THE INVENTION

In certain embodiments, a vehicle interior component includes a foam layer having a contact surface. The vehicle interior component also includes a cover layer having a contact surface and a show surface. The show surface is configured to face an interior of a vehicle, the contact surface of the cover layer is positioned on an opposite side of the cover layer from the show surface, and the contact surface of the cover layer is in direct contact with the contact surface of the foam layer. In addition, multiple recesses are formed within at least one of the contact surface of the foam layer and the contact surface of the cover layer, each recess is at least 0.1 mm wide and at least 0.05 mm deep, each recess establishes a gap between the contact surface of the foam layer and the contact surface of the cover layer at the recess, and the recesses are configured to accommodate gas emitted by the foam layer and/or the cover layer.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
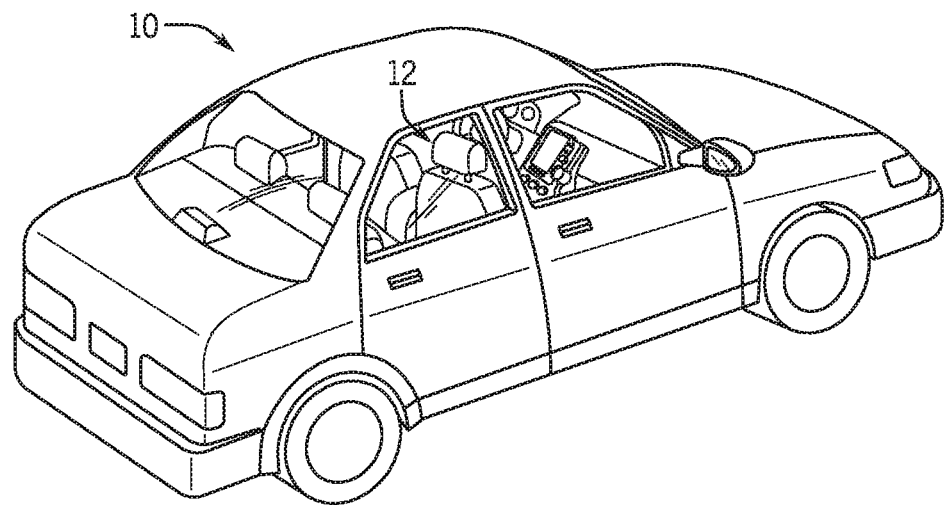
FIG. 1 is a perspective view of an embodiment of a vehicle that may include at least one vehicle interior component having a foam layer and a cover layer.

FIG. 1 is a perspective view of an embodiment of a vehicle 10 that may include at least one vehicle interior component having a foam layer and a cover layer. The vehicle interior component may be disposed within an interior 12 of the vehicle 10. In certain embodiments, the vehicle interior component includes a foam layer having a contact surface, and a cover layer having a contact surface and a show surface. The show surface is configured to face the interior 12 of the vehicle 10, and the contact surface is positioned on an opposite side of the cover layer from the show surface. In addition, the contact surface of the cover layer is in direct contact with the contact surface of the foam layer. As discussed in detail below, multiple recesses are formed within at least one of the contact surface of the foam layer and the contact surface of the cover layer. Each recess establishes a gap between the contact surface of the foam layer and the contact surface of the cover layer at the recess. The gaps accommodate gas emitted by the foam layer and/or the cover layer, thereby substantially reducing or eliminating warping and/or distortion of the cover layer from off gassing of the foam layer and/or the cover layer.

Figure 2:
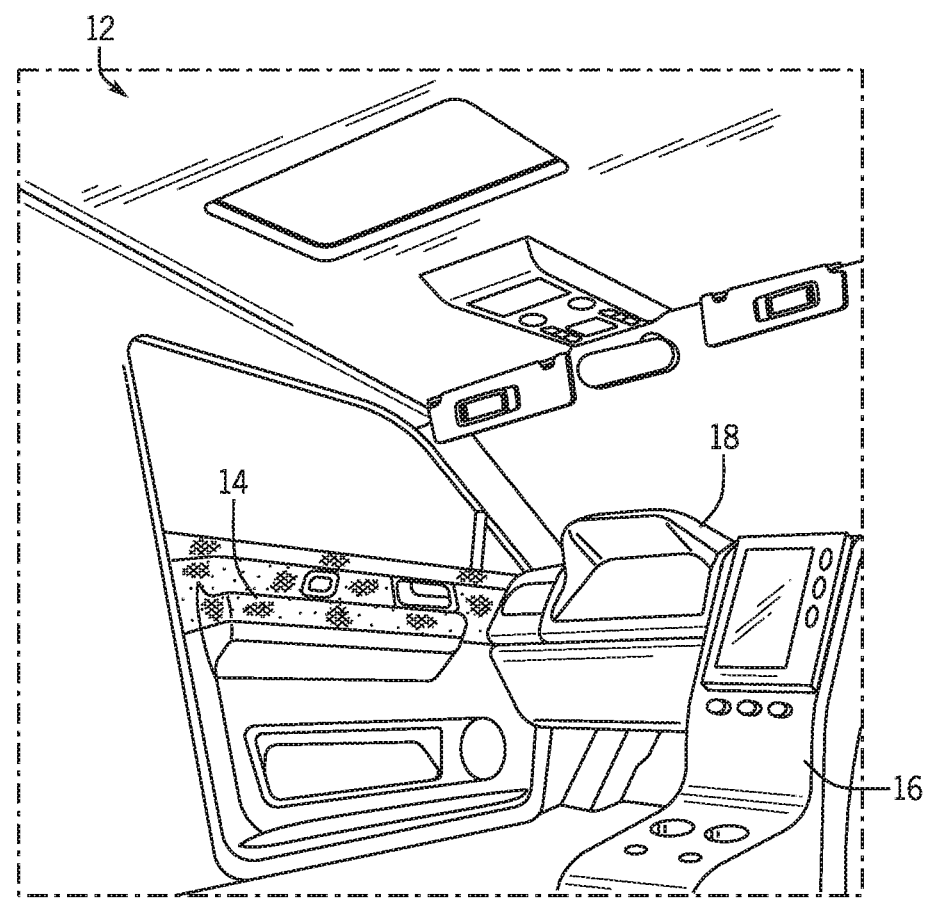
FIG. 2 is a perspective view of a part of the interior of the vehicle of FIG. 1.

FIG. 2 is a perspective view of a part of the interior 12 of the vehicle of FIG. 1. In the illustrated embodiment, an arm rest 14, a center console 16, and an instrument panel 18 are disposed within the interior 12 of the vehicle. The vehicle interior component disclosed herein may form at least a portion of the arm rest 14, at least a portion of the center console 16, at least a portion of the instrument panel 18, or another suitable element of the vehicle interior. In certain embodiments, the vehicle interior component is formed by a process including forming a foam layer within a first mold, in which the foam layer has a contact surface. The process also includes forming a cover layer within a second mold, in which the cover layer has a contact surface and a show surface, and the contact surface of the cover layer is positioned on an opposite side of the cover layer from the show surface. In addition, the process includes placing the contact surface of the cover layer in direct contact with the contact surface of the foam layer. As discussed in detail below, the first mold has protrusions configured to form corresponding recesses within the contact surface of the foam layer, and/or the second mold has protrusions configured to form corresponding recesses within the contact surface of the cover layer. Each protrusion may be configured to form a corresponding recess that is at least 0.1 mm wide and at least 0.05 mm deep. Furthermore, each recess establishes a gap between the contact surface of the foam layer and the contact surface of the cover layer at the recess while the contact surface of the cover layer is in direct contact with the contact surface of the foam layer, and the recesses are configured to accommodate gas emitted by the foam layer and/or the cover layer. The recesses within the contact surface of the cover layer and/or within the contact surface of the foam layer obviate use of a barrier layer between the foam layer and the cover layer (e.g., which may be used to separate the cover layer from the foam layer), thereby substantially reducing material costs and manufacturing complexity of the vehicle interior component.

Figure 3:
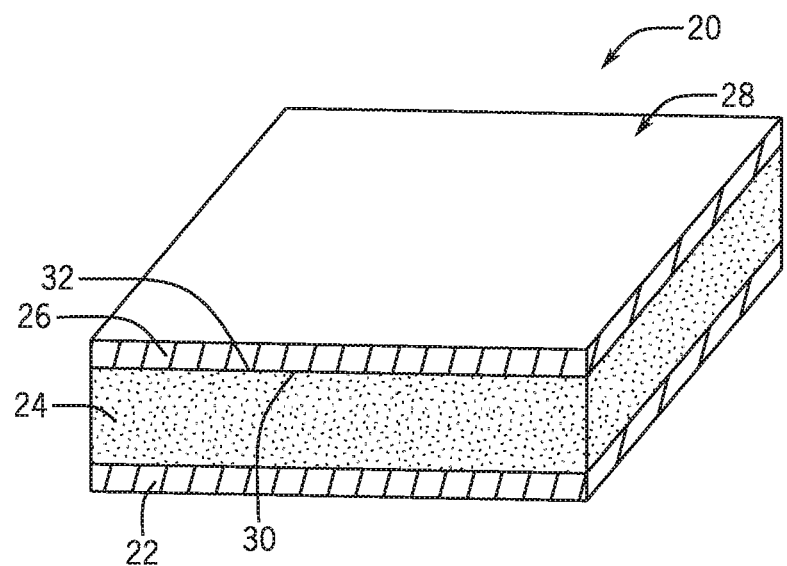
FIG. 3 is a cross-sectional perspective view of an embodiment of a vehicle interior component that may be disposed within the vehicle interior of FIG. 2.

FIG. 3 is a cross-sectional perspective view of an embodiment of a vehicle interior component 20 that may be disposed within the vehicle interior of FIG. 2. In the illustrated embodiment, the vehicle interior component 20 includes a substrate layer 22, a foam layer 24, and a cover layer 26. The cover layer 26 has a show surface 28 that is configured to face the interior of the vehicle. For example, if the vehicle interior component forms part of an armrest, the arm of a vehicle occupant may be placed in contact with the show surface 28 of the cover layer 26. Furthermore, if the vehicle interior component forms part of an instrument panel, the show surface 28 of the cover layer 26 may be visible to the vehicle occupant. While the show surface 28 of the cover layer 26 is substantially smooth in the illustrated embodiment, in other embodiments, the show surface of the cover layer may be textured (e.g., to simulate the appearance of leather, to simulate a stitched seam, etc.).

As illustrated, the cover layer 26 also includes a contact surface 30 positioned on an opposite side of the cover layer 26 from the show surface 28. In addition, the foam layer 24 has a corresponding contact surface 32 facing the contact surface 30 of the cover layer 26. In the illustrated embodiment, the contact surface 30 of the cover layer 26 is in direct contact with the contact surface 32 of the foam layer 24. That is, no barrier layer is positioned between the cover layer 26 and the foam layer 24, thereby enabling the cover layer 26 and the foam layer 24 to directly contact one another. While the cover layer and the foam layer are in direct contact with one another, and no barrier layer is positioned between the cover layer and the foam layer throughout the vehicle interior component in the illustrated embodiment, in certain embodiments, a barrier layer may be positioned between the cover layer and the foam layer within a portion of the vehicle interior component, such that the contact surface of the cover layer does not directly contact the contact surface of the foam layer within the portion of the vehicle interior component.

In the illustrated embodiment, the substrate layer 22 is in contact with the foam layer 24. In certain embodiments, the substrate layer 22 may be substantially rigid, thereby providing structural support to the vehicle interior component 20. Furthermore, in certain embodiments, the substrate 22 may be bonded to the foam layer 24 (e.g., via an adhesive connection). However, in other embodiments, the substrate may be omitted, and the vehicle interior component may be formed by the foam layer and the cover layer (e.g., alone or in combination with other suitable element(s)).

In certain embodiments, the foam layer includes (e.g., is formed from) a polyurethane foam, and/or the cover layer includes (e.g., is formed from) polyvinyl chloride. The polyurethane and/or the polyvinyl chloride may off gas (e.g., emit gas as a result of chemical reaction(s) occurring within the layer) after the cover layer is placed in contact with the foam layer. Accordingly, in the illustrated embodiment, multiple recesses are formed within at least one of the contact surface 32 of the foam layer 24 and the contact surface 30 of the cover layer 26. For example, the recesses may be formed within the contact surface 32 of the foam layer 24 alone, the recesses may be formed within the contact surface 30 of the cover layer 26 alone, or the recesses may be formed within the contact surface 32 of the foam layer 24 and the contact surface 30 of the cover layer 26.

As discussed in detail below, each recess establishes a gap between the contact surface 32 of the foam layer 24 and the contact surface 30 of the cover layer 26 at the recess. In addition, each recess may have a width of at least 0.1 mm and a depth of at least 0.05 mm. Accordingly, the recesses may accommodate the gas emitted by the foam layer 24 and/or the cover layer 26. As a result, the possibility of gas emitted by the foam layer and/or the cover layer causing warpage and/or distortion of the cover layer is substantially reduced or eliminated. In addition, recesses obviate use of a barrier layer between the foam layer and the cover layer (e.g., which may be used to separate the cover layer from the foam layer), thereby substantially reducing material costs and manufacturing complexity of the vehicle interior component.

Figure 4:
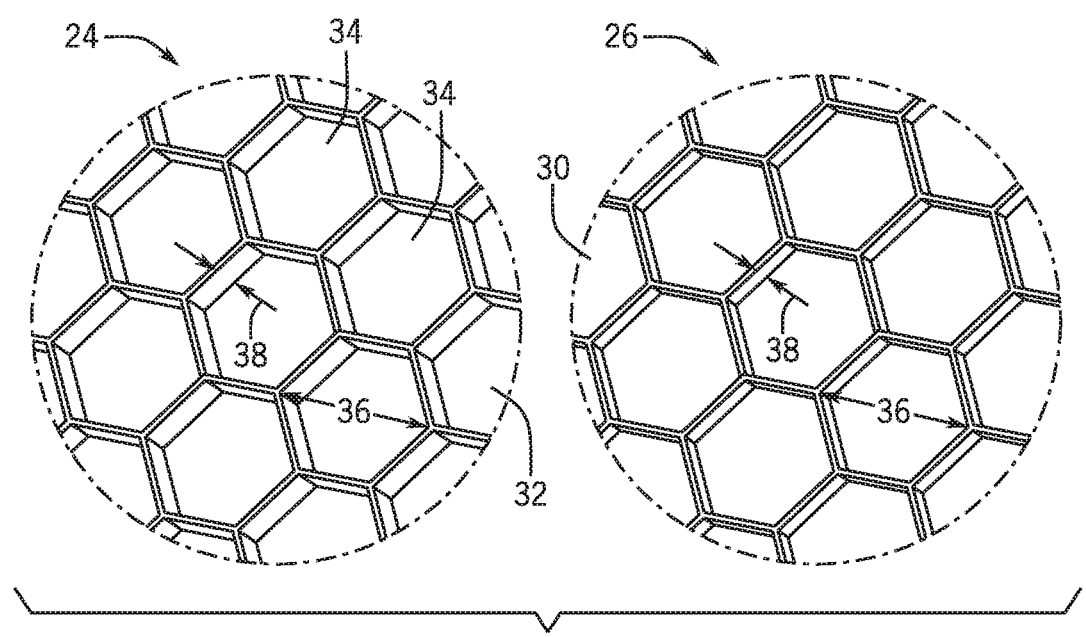
FIG. 4 is a perspective view of an embodiment of a foam layer and an embodiment of a cover layer that may be employed within the vehicle interior component of FIG. 3.

FIG. 4 is a perspective view of an embodiment of a foam layer 24 and an embodiment of a cover layer 26 that may be employed within the vehicle interior component of FIG. 3. In the illustrated embodiment, multiple recesses 34 are formed within the contact surface 32 of the foam layer 24, and multiple recesses 34 are formed within the contact surface 30 of the cover layer 26. Accordingly, when the cover layer is placed in contact with the foam layer, the recessed contact surfaces contact one another. In certain embodiments, the contact surface of the cover layer may have a recesses portion and a non-recessed portion, and the contact surface of the foam layer may have a recessed portion and a non-recessed portion. In such embodiments, the recessed portion of the cover layer contact surface may contact the non-recessed portion of the foam layer contact surface, the recessed portion of the foam layer contact surface may contact the non-recessed portion of the cover layer contact surface, the recessed portion of the foam layer contact surface may contact the recessed portion of the cover layer contact surface, or a combination thereof. Furthermore, in certain embodiments, the recesses may be formed only within the contact surface of the foam layer, or the recesses may be formed only within the contact surface of the cover layer.

In the illustrated embodiment, each recess 34 formed within the contact surface 32 of the foam layer 24 and each recess 34 formed within the contact surface 30 of the cover layer 26 has a substantially hexagonal (e.g., polygonal) shape. However, in alternative embodiments, at least one recess may have another suitable shape, such as another substantially polygonal shape (e.g., a substantially triangular shape, a substantially square shape, etc.), a substantially circular shape, or a substantially elliptical shape, among other suitable shapes. In addition, while each recess has a substantially linear contour along the depth of the recess in the illustrated embodiment, in other embodiments, at least one recess may have another suitable contour. For example, in certain embodiments, at least one recess may have a curved contour along the depth of the recess (e.g., forming a substantially hemispherical recess), and/or at least one recess may have a tapered contour along the depth of the recess (e.g., forming a substantially pyramidal recess). Furthermore, in certain embodiments, the shapes of the recesses may vary within one contact surface. For example, the contact surface of the foam layer may have substantially polygonal recesses and substantially circular recesses. In addition, in embodiments in which recesses are formed within the contact surface of the foam layer and the contact surface of the cover layer, the shape(s) of the recesses formed within the foam layer contact surface may be different than the shape(s) of the recesses formed within the cover layer contact surface.

In certain embodiments, a width 36 (e.g., maximum width) of each recess 34 may be at least 0.1 mm. For example, the width 36 of each recess 34 may be about 0.1 mm to about 10 mm, about 0.5 mm to about 5 mm, or about 2 mm to about 3 mm. For example, in certain embodiments, the width 36 of each recess may be at least 2 mm. Furthermore, in certain embodiments, a depth 38 (e.g., maximum depth) of each recess 34 may be at least 0.05 mm. For example, the depth 38 of each recess 34 may be about 0.05 mm to about 4 mm, about 0.1 mm to about 2 mm, or about 0.2 mm to about 1 mm. For example, in certain embodiments, the depth 38 of each recess may be at least 0.2 mm. The dimensions of the recesses may be particularly selected (e.g., each recess being at least 0.1 mm wide and at least 0.05 mm deep) to accommodate gas emitted by the cover layer and/or the foam layer. In the illustrated embodiment, the recesses formed within the foam layer contact surface 32 and the cover layer contact surface 30 have substantially the same dimensions. However, in other embodiments, the dimensions of the recesses may vary within one contact surface. For example, the contact surface of the foam layer may have deeper recesses and shallower recesses and/or wider recesses and narrower recesses. In addition, in embodiments in which recesses are formed within the contact surface of the foam layer and the contact surface of the cover layer, the dimensions of the recesses formed within the foam layer contact surface may be different than the dimensions of the recesses formed within the cover layer contact surface.

The shape and the dimensions of each recess may be particularly selected to accommodate gas emitted by the cover layer and/or the foam layer and to establish a desired feel in response to deformation of the vehicle interior component by a vehicle occupant. For example, the vehicle interior component may form at least a portion of an arm rest, and a vehicle occupant may place an arm in contact with the cover layer of the vehicle interior component. The shape and/or dimensions of each recess within the contact surface of the cover layer may control the deformation of the cover layer, thereby establishing a desired response to deformation of the vehicle interior component. Additionally or alternatively, the shape and/or dimensions of each recess within the contact surface of the foam layer may control the deformation of the foam layer, thereby establishing a desired response to deformation of the vehicle interior component. In addition, as previously discussed, the recesses within the foam layer contact surface and/or within the cover layer contact surface are configured to accommodate gas emitted by the foam layer and/or the cover layer, thereby substantially reducing or eliminating warping and/or distortion of the cover layer from the off gassing of the foam layer and/or the cover layer.

Figure 5:
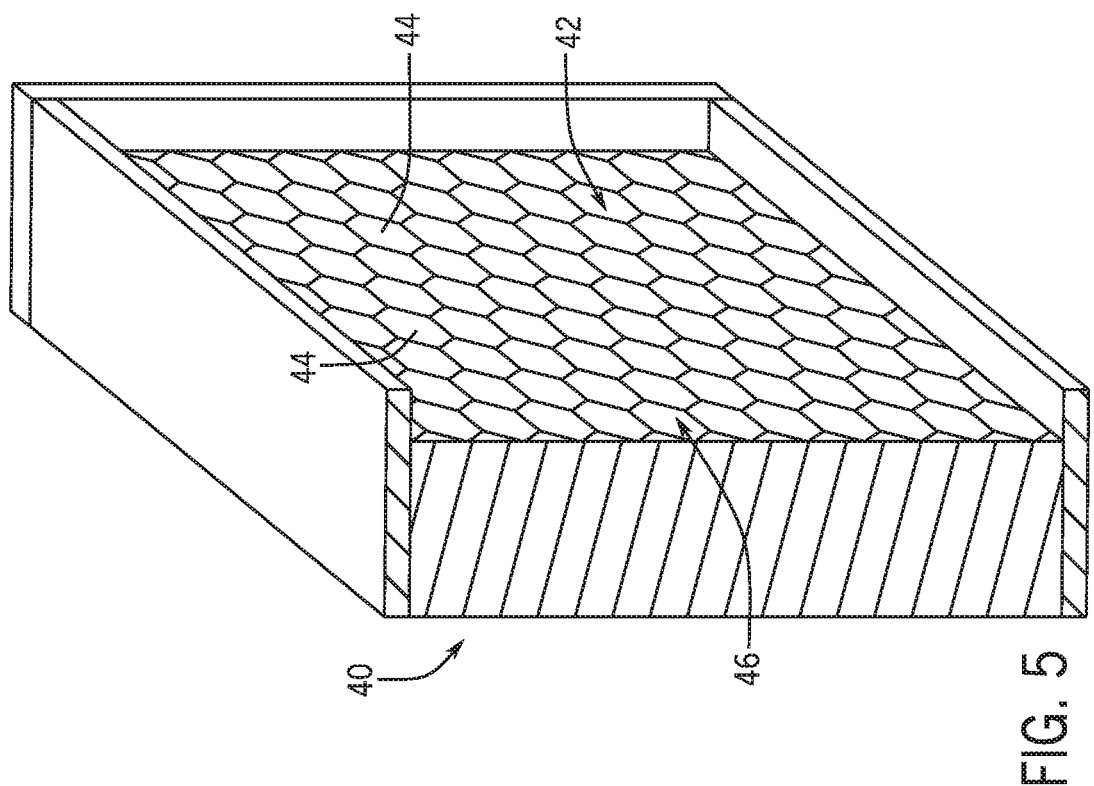
FIG. 5 is a cross-sectional perspective view of an embodiment of a mold element of a mold that may be used to form the foam layer or the cover layer of FIG. 4.

FIG. 5 is a cross-sectional perspective view of an embodiment of a mold element 40 of a mold that may be used to form the foam layer or the cover layer of FIG. 4. In the illustrated embodiment, the mold element 40 includes a cavity 42 configured to receive a liquid polymer material suitable for forming the foam layer or the cover layer. In certain embodiments, the mold element 40 is used to form the foam layer via a reactive foaming process. For example, liquid polyurethane may be provided to the mold cavity 42. During the molding process, the liquid polyurethane expands to fill the cavity 42, which is enclosed by another suitable mold element. In the illustrated embodiment, multiple protrusions 44 are formed on an interior surface 46 of the mold element 40. The protrusions 44 may be formed by any suitable process, such as machining, laser cutting, or chemical etching. The protrusions 44 are configured to form corresponding recesses within the contact surface of the foam layer as the liquid polyurethane expands to engage the interior surface 46 of the mold element 40. Accordingly, when the foam layer is formed and removed from the mold, multiple recesses are formed within the contact surface of the foam layer, as discussed above. While the foam layer discussed above is formed from polyurethane, in other embodiments, the foam layer may be formed from another suitable type of polymeric material.

Furthermore, in certain embodiments, the mold element 40 is used to form the cover layer via an injection molding process. For example, liquid polyvinyl chloride may be injected into the mold cavity 42. During the molding process, the liquid polyvinyl chloride engages the interior surface 46 of the mold element 40. Accordingly, the protrusions 44 on the interior surface of the mold element 40 form corresponding recesses within the contact surface of the cover layer. As such, when the cover layer is formed and removed from the mold, multiple recesses are formed within the contact surface of the cover layer, as discussed above. In certain embodiments, another mold element of the mold positioned on an opposite side of the cavity from the illustrated mold element may include a textured surface configured to form a corresponding textured surface on the show surface of the cover layer. While the cover layer discussed above is formed from polyvinyl chloride, in other embodiments, the cover layer may be formed from another suitable type of polymeric material.

Figure 6:
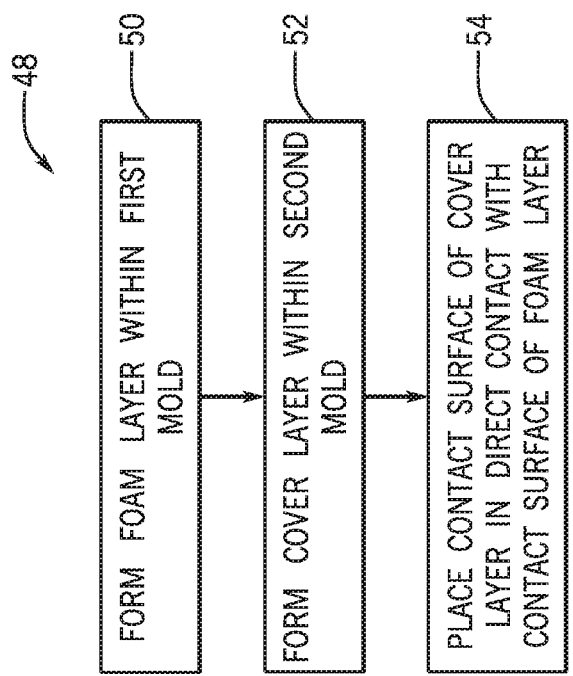
FIG. 6 is a flow chart of a method of manufacturing a vehicle interior component.

FIG. 6 is a flow chart of a method 48 of manufacturing a vehicle interior component. First, as represented by block 50, a foam layer is formed within a first mold, in which the foam layer has a contact surface. As previously discussed, the foam layer may be formed by flowing polyurethane into the first mold. Next, as represented by block 52, a cover layer is formed within a second mold, in which the cover layer has a contact surface and a show surface. As previously discussed, the contact surface of the cover layer is positioned on an opposite side of the cover layer from the show surface. Furthermore, in certain embodiments, the cover layer may be formed by flowing polyvinyl chloride into the second mold. In certain embodiments, the first mold and/or the second mold has multiple protrusions configured to form corresponding recesses within the contact surface of the foam layer and/or the contact surface of the cover layer, respectively. In addition, in certain embodiments, each protrusion is configured to form a corresponding recess that is at least 0.1 mm wide and at least 0.05 mm deep.

As represented by block 54, the contact surface of the cover layer is placed in direct contact with the contact surface of the foam layer. In certain embodiments, the contact surface of the cover layer is pressed against the contact surface of the foam layer via a mechanical connection. For example, a substantially rigid substrate layer may be bonded to the foam layer (e.g., via an adhesive connection). The cover layer may be wrapped around the foam layer and mechanically coupled to the substantially rigid substrate layer. The mechanical coupling between the cover layer and the substantially rigid substrate layer may urge/drive the contact surface of the cover layer into direct contact with the contact surface of the foam layer. However, in other embodiments, the contact surface of the cover layer may be urged/driven into contact with the contact surface of the foam layer by another suitable connection (e.g., another suitable mechanical connection, an adhesive disposed between a portion of the cover layer contact surface and a corresponding portion of the foam layer contact surface, etc.).

With the contact surface of the cover layer in direct contact with the contact surface of the foam layer, a gap is established between the contact surfaces at each recess. The gaps accommodate gas emitted by the foam layer and/or the cover layer, thereby substantially reducing or eliminating warping and/or distortion of the cover layer from the off gassing of the foam layer and/or the cover layer. In addition, the method does not include disposing a barrier layer between the foam layer and the cover layer. Because the vehicle interior component does not include a barrier layer between the contact surface of the foam layer and the contact surface of the cover layer, the cost of materials and/or the manufacturing complexity of the vehicle interior component may be substantially reduced.

Figure 7:
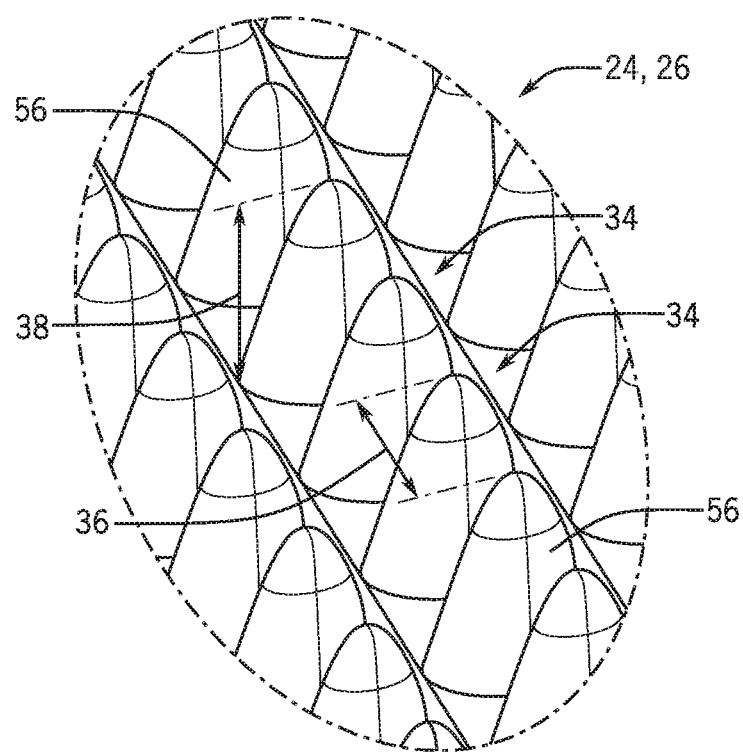
FIG. 7 is a perspective view of another embodiment of a foam layer or a cover layer that may be employed within the vehicle interior component of FIG. 3.

FIG. 7 is a perspective view of another embodiment of a foam layer 24 or a cover layer 26 that may be employed within the vehicle interior component of FIG. 3. In the illustrated embodiment, multiple recesses 34 are formed within the contact surface of the foam layer 24/cover layer 26. Accordingly, when the cover layer is placed in contact with the foam layer, the recessed contact surface of one layer directly contacts the contact surface (e.g., the recessed contact surface or the non-recessed contact surface) of the other layer. In certain embodiments, the recesses may be formed only within the contact surface of the foam layer, or the recesses may be formed only within the contact surface of the cover layer.

In the illustrated embodiment, the recesses 34 are formed between protrusions 56 of the contact surface of the foam layer 24/cover layer 26. That is, the protrusions 56 are formed within the contact surface, thereby establishing the recesses 34 of the contact surface. Accordingly, the recesses 34 are interconnected with one another (e.g., as compared to the separated recesses described above with referenced to FIG. 4). While all of the recesses 34 within the contact surface of the foam layer 24/cover layer 26 are interconnected in the illustrated embodiment, in certain embodiments, the contact surface may have one or more separated recesses and/or multiple interconnected recesses. In the illustrated embodiment, each protrusion 56 has a generally conical shape. However, in other embodiments, at least one protrusion may have another suitable shape (e.g., substantially cylindrical, substantially prismatic, substantially hemispherical, etc.). Furthermore, in certain embodiments, the shapes of the protrusions may vary throughout the contact surface of the foam layer 24/cover layer 26, thereby establishing recesses of varying shapes.

In certain embodiments, a width 36 of each recess 34 (e.g., maximum width, width between distal ends of the surrounding protrusions 56, etc.) may be at least 0.1 mm. For example, the width 36 of each recess 34 may be about 0.1 mm to about 10 mm, about 0.5 mm to about 5 mm, or about 2 mm to about 3 mm. For example, in certain embodiments, the width 36 of each recess may be at least 2 mm. Furthermore, in certain embodiments, a depth 38 of each recess 34 (e.g., maximum depth, distance between the distal end and the proximal end of neighboring protrusion(s), etc.) may be at least 0.05 mm. For example, the depth 38 of each recess 34 may be about 0.05 mm to about 4 mm, about 0.1 mm to about 2 mm, or about 0.2 mm to about 1 mm. For example, in certain embodiments, the depth 38 of each recess may be at least 0.2 mm. The dimensions of the recesses may be particularly selected (e.g., each recess being at least 0.1 mm wide and at least 0.05 mm deep) to accommodate gas emitted by the cover layer and/or the foam layer. In the illustrated embodiment, the recesses formed within the contact surface of the foam layer 24/cover layer 26 have substantially the same dimensions. However, in other embodiments, the dimensions of the recesses may vary throughout the cover layer.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A vehicle interior component, comprising:
   a foam layer having a contact surface; and
   a cover layer having a contact surface and a show surface, wherein the show surface is configured to face an interior of a vehicle, the contact surface of the cover layer is positioned on an opposite side of the cover layer from the show surface, and the contact surface of the cover layer is in direct contact with the contact surface of the foam layer;
   wherein a plurality of recesses is formed within at least one of the contact surface of the foam layer or the contact surface of the cover layer, each recess of the plurality of recesses is at least 0.1 mm wide and at least 0.05 mm deep, each recess of the plurality of recesses establishes a gap between the contact surface of the foam layer and the contact surface of the cover layer at the recess, the plurality of recesses are formed between a respective plurality of protrusions, the plurality of recesses are interconnected with one another, at least one protrusion of the plurality of protrusions has a rounded tip portion while the at least one protrusion is in an uncompressed state, a radius of curvature of the rounded tip portion of the at least one protrusion is less than a radius of a base of the at least one protrusion while the at least one protrusion is in the uncompressed state, and the plurality of recesses is configured to accommodate gas emitted by the foam layer, the cover layer, or a combination thereof.

2. The vehicle interior component of claim 1, wherein the foam layer comprises polyurethane foam.

3. The vehicle interior component of claim 1, wherein the cover layer comprises polyvinyl chloride.

4. The vehicle interior component of claim 1, wherein a first portion of the plurality of recesses is formed within the contact surface of the foam layer.

5. The vehicle interior component of claim 1, wherein a second portion of the plurality of recesses is formed within the contact surface of the cover layer.

6. The vehicle interior component of claim 1, wherein a first portion of the plurality of recesses is formed within the contact surface of the foam layer, and a second portion of the plurality of recesses is formed within the contact surface of the cover layer.

7. The vehicle interior component of claim 1, wherein no barrier layer is positioned between the foam layer and the cover layer.

8. The vehicle interior component of claim 1, wherein each recess of the plurality of recesses is at least 0.2 mm deep, each recess of the plurality of recesses is at least 2 mm wide, or a combination thereof.

* * * * *